May 19, 1964  M. A. SHRIRO  3,134,084
ULTRA-HIGH-TEMPERATURE POTENTIOMETER
Filed Aug. 16, 1962

INVENTOR
*MORRIS A. SHRIRO*

BY *Leonard H. King*
ATTORNEY

United States Patent Office 3,134,084
Patented May 19, 1964

3,134,084
ULTRA-HIGH-TEMPERATURE POTENTIOMETER
Morris A. Shriro, 88 Sheridan Ave., Mount Vernon, N.Y.
Filed Aug. 16, 1962, Ser. No. 217,342
19 Claims. (Cl. 338—162)

The present invention relates to rotary potentiometers provided with a high temperature resistant ceramic element, and more particularly to improved means for locating and securing a ceramic element in a metal case so as to maintain rigidity of position and concentricity during extreme temperature changes.

Recent advances in nuclear and space technology have created a need for electronic components able to function at high temperatures and in a radioactive environment. A particularly difficult problem is the construction of a precision potentiometer able to withstand ultra-high temperatures, say, in the neighborhood of 500° C. Such temperatures are encountered during reentry into the atmosphere by orbital bodies, and can also be expected in areas of intense nuclear radiation. In some applications, the device may be subjected to a very wide temperature range, for example, from −65° C. to 500° C., occurring over a short time interval, with attendant stresses due to the fact that unequal temperature coefficients of expansion exist between abutting parts within the device. Even where mating parts have closely similar temperature coefficients of expansion, differing thermal conductivities can give rise to temperature differences which cause high local stresses during rapid heating or cooling. Conventional potentiometers cannot withstand such extremes of environment. Although the materials presently available for stable operation at such temperatures in precision potentiometers are not usually matched as to temperature coefficient and thermal conductivity, the present invention offers novel means for utilizing these materials, thus providing a practical potentiometer in this critical area of application.

The most advantageous substances presently available for resistive tracks and conductive tracks are cermet materials, which can be made electrically resistive or conductive as required, and which will function satisfactorily in the indicated temperature ranges. In practice, the cermet is fired on a ceramic substrate such as steatite or alumina. These bases, having been formed by sintering or fusing processes, do not have close physical tolerances. Also, openings formed in this ceramic base as fired, for the purpose of mounting the base in a potentiometer casing, will have variations in dimension making the use of these openings impractical for precise mounting and centering on the potentiometer casing.

A further difficulty encountered with the ceramic element is in positioning it in close registry with portions of the metallic casing. Differences in coefficient of temperature expansion and thermal conductivity between the element and metal support members will result in dislodging the ceramic element from the center position or, if tightly fitted, will even split it. Even though a favorable temperature coefficient correlation between the ceramic elements and certain stainless steels exists, in practice it has been found that the metal will heat much more rapidly than the ceramic. As a result, if rapid heating takes place, extreme forces will be set up between the metallic support and the ceramic base which will put the ceramic in tension. To avoid this condition, it is necessary to provide means for eliminating these disruptive tensions between the metallic support and the ceramic element.

It is therefore a primary object of the present invention to provide a precision potentiometer adapted to function efficiently in an environment of ultra-high temperature.

It is a further object of the present invention to provide means for locating and mounting a ceramic element on a metallic support whereby splitting of the element may be avoided.

Yet a further object of the present invention is to provide means for accurate centering of a ceramic element whereby a cermet formed on the element may be made concentric to the shaft, within close tolerances.

Still a further object of the present invention is to provide a precision potentiometer of simplified construction employing materials presently available, for use in extreme environmental conditions.

These and other objects and advantages of the present invention will be set forth in further particularity or will be apparent from the following description and the drawings appended thereto in which.

Figure 1:
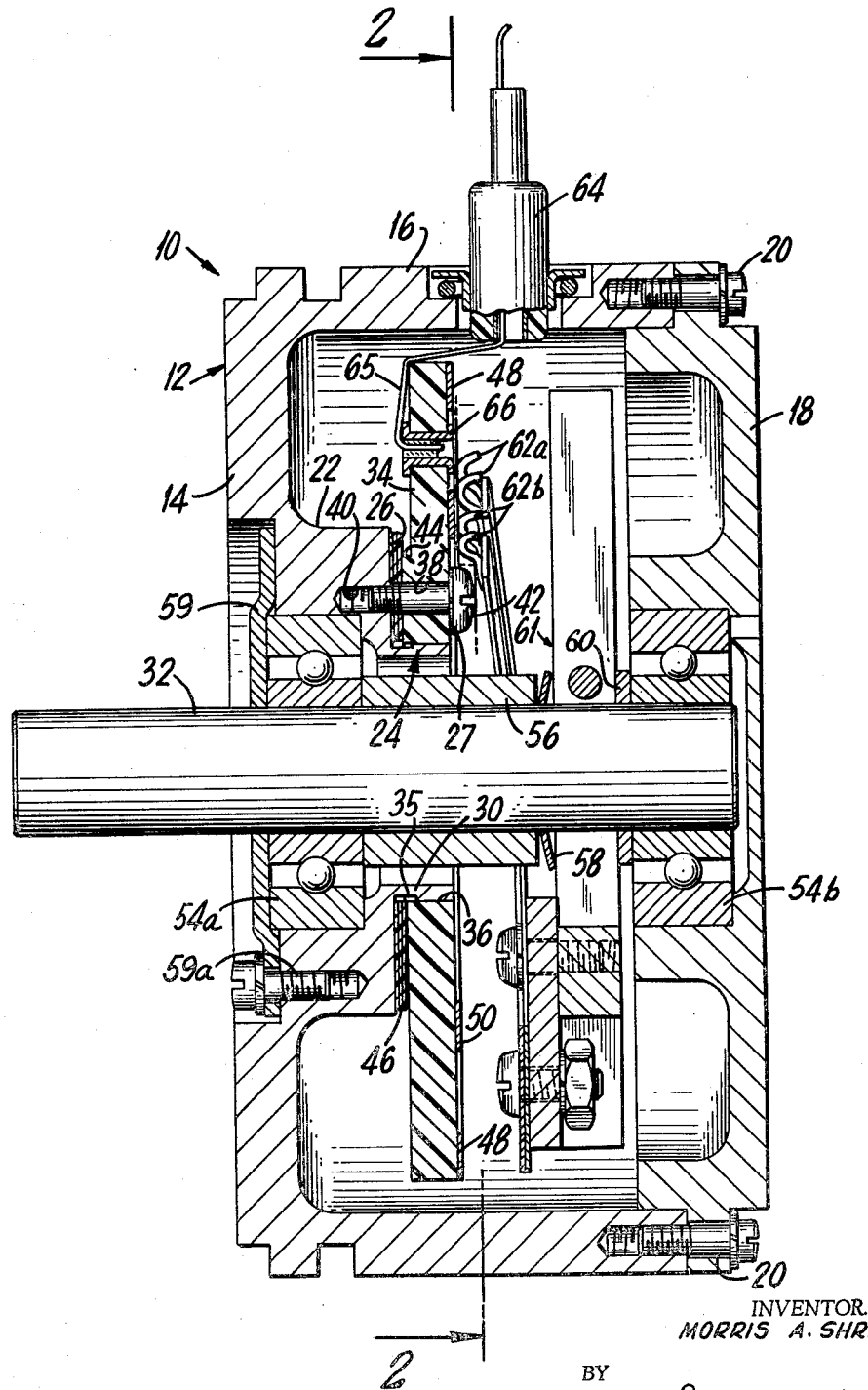
FIG. 1 is a side view in cross-section of a device of the present invention.
Figure 2:
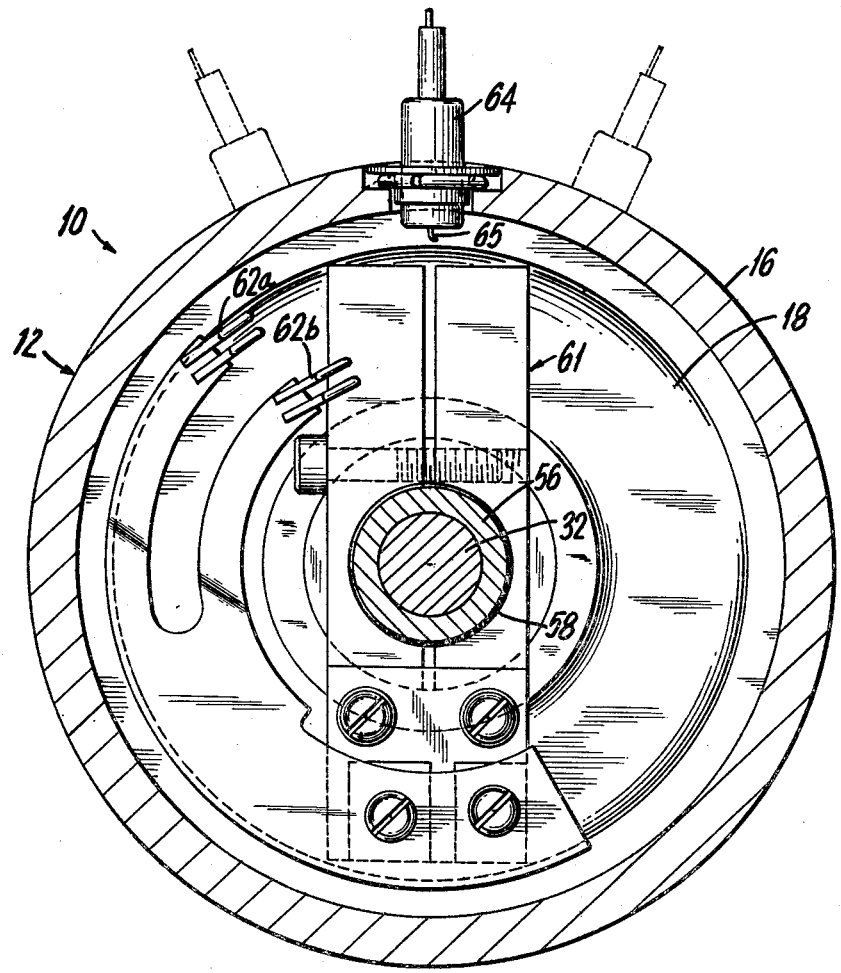
FIG. 2 is an end view of the device of the present invention taken along line 2—2 of FIG. 1 shown with the end wall removed.
Figure 3:
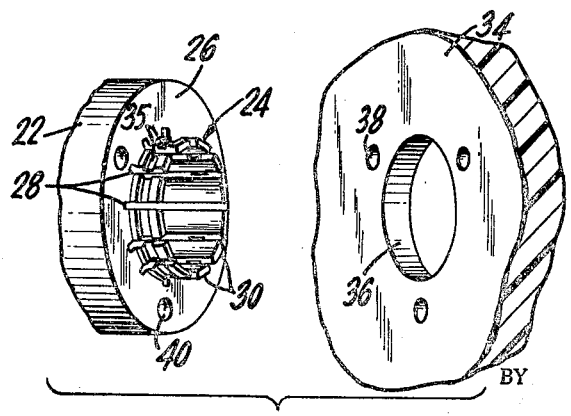
FIG. 3 is an exploded perspective view illustrating the cooperation of the castellated pilot and the ceramic element.

Referring now more particularly to the drawing, there is shown in FIG. 1 a sectional side view of the present invention, characterized generally by the numeral 10, comprising a cup-shaped member 12 having apertured end wall 14 and cylindrical side wall 16. End cap 18 is secured to side wall 16 by screw means 20 to define an enclosed cylindrical casing. The casing is preferably formed of high temperature resistant material, such as type 440 stainless steel. End wall 14 is formed with an internal boss 22, on the end portion of which is formed a longitudinally slotted pilot 24 of reduced diameter, the juncture of boss and the pilot defining internal shoulder 26. As shown in FIG. 3, slots 28 formed longitudinally through pilot 24 define individual fingers or segments 30, concentrically deployed about and spaced from shaft 32. Fingers 30 form a resilient support and locating structure for ceramic substrate 34. The fingers are preferably formed with a transverse undercut 35 (FIG. 3) to increase the resilience of the supporting fingers, thereby making a closer fit possible. The ceramic substrate is a disc-like member having bore portion 36 registering in close resilient fit with fingers 30. Bore portion 36 is ground to the closest possible tolerance (e.g., ±0.001″) subsequent to firing of the ceramic substrate and this bore is used as the locating means in connection with all subsequent operations on the base. It will thus be appreciated that the substrate is properly centered relative to the rotatable shaft, which is essential to precision operation of the device. Thus the ceramic member is supported by a metal member of relatively small size and stress is minimized, in contrast to a condition where the ceramic member is secured at a large diameter portion which would subject the member to much higher stresses under conditions of changing temperature.

Clearance holes 38 are formed transversely through substrate 34, registering with internally threaded openings 40 formed in shoulder 26. Bolts 42 of smaller diameter than holes 38 are passed therethrough to threadedly engage openings 40, thereby urging end wall 44 of substrate 34 towards shoulder 26. Mica sheet 46 is interposed between end wall 44 and shoulder 26 serving as a cushioning member in cooperation with split ring washers 27. These washers are preferably made of Inconel-X which retains its resilience at very high temperatures. Inconel-X, a product of the International Nickel Company, is a wrought, non-magnetic, age-hardened variation of Inconel affords high rupture strength and low creep rates under high stress at temperatures of up to 1500° F. Its short time tensile strength at 1200° F. is about 80% of its room temperature properties. It will be noted from FIG. 1 that bolts 42 are of slightly smaller diameter than holes 38. Bolts 42 serve essentially to position substrate 34 axially within the casing rather than angularly; however, taken in conjunction with the locating and support means provided by fingers 30 described hereinabove, substrate 34 is centered within the casing with a very high degree of accuracy.

The substrate in a preferred embodiment is formed of steatite, while the fingers are formed of chrome-plated type 440 stainless steel. It should be noted that this combination appears less favorable than other types of steel and other ceramics, where a close correlation of temperature coefficients of expansion can be attained. For example, type 440 stainless steel is similar in temperature coefficient of expansion ($5.6 \times 10^{-6}$ in./in./° F.) to low expansion grade of alumina ($5.7 \times 10^{-6}$ in./in./° F.). In contrast to this, steatite has a markedly higher temperature coefficient of expansion, namely, $9.8 \times 10^{-6}$ in./in./° F., hence apparently not adapted to be used in conjunction with a support member formed of type 440 stainless steel. However, these two materials have been shown to be of prime importance in the temperature range of interest, the steel in question having proper machinability and satisfactory resistance to corrosion at high temperatures, while the steatite substrate is especially adaptable to bonding a cermet resistance track. It is a particular feature of the present invention to utilize these materials, since the mounting means described hereinabove eliminate the fracturing of the substrate resulting from unequal rates of expansion.

In making the ceramic element, bore 36 and holes 38 are formed in the substrate during the molding process. After the firing process, bore 36 is processed by grinding means to the closest attainable tolerance, at present to within 0.001 of an inch. Cermet resistance track 48 and cermet conductive track 50 are then fired on the base by means well known in the art. The base is maintained in an arbor to insure concentricity while the cermet is being applied to the substrate, or ground to size, as may be most appropriate for the process being used.

It will be appreciated that the wall of bore 36 defines the critical locating surface for establishing concentricity, hence precision in the device. Since the tracks have been made concentric with the bore, and the bore is mounted concentric with reference to the casing with a very high degree of accuracy, as explained hereinabove, the rotating elements of the device will be in registry with the base, thus insuring precision potentiometer performance.

As shown in FIG. 1, the device in the assembled condition has the conventional rotary potentiometer configuration including central shaft 32 rotatably mounted on bearings 54a—54b. Coaxial spacer sleeve 56 attached to shaft 32 is retained against axial displacement by Belleville ring 58. Ring 58 is preferably formed of an alloy such as Inconel-X, which retains its resiliency at high temperatures. Among such alloys Inconel-X is particularly advantageous for use in environments of nuclear radiation because it contains comparatively small amounts of cobalt and does not contain other seriously objectionable elements except as minor impurities. Bearing retainer 59, secured to end wall 14 by threaded screws 59a, serves to position bearing 54a. Similarly, bearing 54b is retained against axial displacement by spacer 60 against which brush block 61 is thrust by Belleville washer 58 acting against sleeve 56. The brush block 61 carries wiping contacts 62a—62b for the resistive and conductive tracks, respectively, the contacts being of multi-finger configuration to reduce arcing and for added reliability. Contacts 62a—62b are preferably formed of platinum-ruthenium, which combination shows favorable high temperature performance characteristics. Metal-ceramic external terminals 64 are disposed in side wall 16 of the casing, and are connected by temperature resistant wires 65 to the resistance and conductive tracks. The wires are spot-welded to eyelets 66 which make contact to the respective tracks.

It will be appreciated that the rotary potentiometer hereinabove described is specifically designed to meet extreme environmental conditions, where critical performance characteristics of stability and linearity must be shown in the temperature range of interest.

There has been disclosed heretofore the best embodiment of the invention presently contemplated and it is to be understood that various changes and modifications may be made by those skilled in the art without departing from the spirit of the invention.

What is claimed is:

1. A rotary potentiometer comprising:
    (a) a housing;
    (b) a rotatable shaft journalled in said housing;
    (c) wiper means supported from said shaft for rotation therewith;
    (d) a supporting element having a central aperture;
    (e) fastening means securing said supporting element to said housing;
    (f) a resistance element carried by said supporting element, said resistance element being concentric with said supporting element central aperture, said resistance element adapted to be variably contacted by said wiper means upon rotation of said shaft; and
    (g) supporting element mounting means integral with said housing and coaxial with said shaft, said mounting means comprising a hollow pilot having a plurality of longitudinal slots extending through the wall thereof, the slots defining a plurality of independent members, said supporting element central aperture being adapted to closely fit onto and to be concentrically and resiliently held by said pilot.

2. The device of claim 1 wherein the slotted portion of said pilot defines a plurality of independent resilient members extending axially from said housing in the interior thereof.

3. A device as in claim 2, wherein said resilient members are each formed with a transverse undercut in a section thereof, to thereby increase the resiliency of said members.

4. A device as in claim 3 wherein said supporting element is formed with a plurality of clearance holes transversely therethrough, said housing having a plurality of internally threaded openings formed therein adapted to register with said clearance holes in the assembled condition, said device being further provided with a plurality of screws disposed in said holes, said screws being spaced from the walls of said holes and threadably engaged with said threaded openings in said housing.

5. A device as in claim 4 wherein a mica cushion is interposed between said supporting element and said housing, said mica cushion being resiliently maintained in place by the urging of said supporting element towards said housing by said screws.

6. A device as in claim 4 wherein said screws are seated against spring washers made of a high temperature resistant, substantially cobalt-free alloy.

7. A rotary potentiometer comprising:
    a cup-shaped casing having an apertured end section;
    a rotatable shaft axially disposed within said casing and having a portion extending externally through said aperture;
    a longitudinally multi-slotted hollow pilot integral with said end section and extending axially therefrom, the slots extending through the wall of said pilot to define a plurality of independent, resilient fingers;
    a ceramic supporting base provided with a central aperture, said base being disposed proximate to said end section, said aperture of said base registering concentrically with said slotted pilot in resilient close fit thereto, said base being provided with a plurality of clearance holes formed transversely therethrough, said end section having a plurality of internally threaded openings formed therein adapted to register with said clearance holes formed in said element in the assembled condition;

a plurality of screws disposed in said holes, threadedly engaging said openings in said end section;

a resistance track and a conductive track carried by said base on the side thereof removed from said end section;

a brush block mounted on said shaft and rotatable therewith;

wiper means carried by said brush block, said wiper means adapted to wipe said resistive track and said conductive track, respectively; and takeoff means to connect said wiper means to an external circuit.

8. A device as in claim 7 wherein a mica cushion is interposed between said supporting base and said end section, said mica cushion being resiliently maintained in place by the urging of said supporting base towards said end section by said screws.

9. A device as in claim 8 wherein said casing is formed of high temperature-resistant stainless steel, said ceramic element being formed of high temperature-resistant steatite, said resistance track being formed of high temperature-resistant cermet resistive material, and said conductive track formed of high temperature-resistant cermet conductive material.

10. A device as in calim 9 wherein said screws are provided with spring washers made of a high temperature, substantially cobalt-free alloy.

11. The device of claim 7 wherein the slotted portion of said pilot defines a plurality of resilient fingers axially extending from said casing internal thereof, said fingers being disposed in concentric arrangement with said rotatable shaft.

12. In a rotary potentiometer provided with a housing, a resistance element carried by a ceramic support member, a rotatable shaft for varying the position of a wiper contacting said resistance element, an improved means for mounting said resistance element concentrically with said shaft, said improved means comprising:

(a) an internal, apertured boss integral with said housing and arranged to concentrically receive said shaft;

(b) a longitudinally multi-slotted hollow pilot integral with said boss, said pilot having a reduced cross section with respect to said boss, said pilot extending axially from said boss, the slots extending through the wall of said pilot to define a plurality of independent, resilient fingers concentric with said rotatable shaft, said support member being formed with a central aperture therethrough, said aperture being adapted to register concentrically with said fingers in a close resilient fit therewith thereby maintaining said resistance element concentric with said shaft; and (c) fastening means to secure said support member to said housing.

13. A device as in claim 12, wherein said fingers are each formed with a transverse undercut in a portion thereof, to thereby increase the resiliency of said fingers.

14. A device as in claim 13 wherein said support member is formed with a plurality of clearance holes transversely therethrough, said boss having a plurality of internally threaded openings formed therein adapted to register with said clearance holes in the assembled condition, said device being further provided with a plurality of screws disposed in said holes, said screws being spaced from the walls of said holes and threadably engaged with threaded openings in said boss.

15. A device as in claim 14 wherein a mica cushion is interposed between said support member and said housing and resiliently maintained in place by the urging of said element towards said boss by said screws.

16. A device as in claim 14 wherein said screws are provided with spring washers made of a high temperature resistant cobalt-free spring alloy.

17. A rotary potentiometer comprising:

(a) a cup-shaped casing having an apertured end wall;

(b) a rotatable shaft axially disposed within said casing and having a portion extending externally through said aperture;

(c) an internal boss formed integrally on said end wall about said aperture and concentric with said shaft;

(d) a longitudinally multi-slotted reduced hollow pilot formed on said boss concentric therewith and axialy extending therefrom, the junction of said pilot and said boss defining an internal shoulder, the slotted portion of said pilot defining a plurality of resilient fingers concentric with said shaft, the slots extending through said pilot wall;

(e) a ceramic supporting base provided with a central aperture, said base being disposed proximate to said boss, said aperture of said base registering concentrically with said slotted pilot in resilient close fit thereto, said base being provided with a plurality of clearance holes formed transversely therethrough, and said internal shoulder having a plurality of internally threaded openings formed therein adapted to register with said clearance holes formed in said base in the assembled condition, and a plurality of screws disposed in said holes spaced from the walls of said holes and threadedly engaging said openings in said internal shoulder;

(f) a resistance track and a conductive track carried by said base on the side thereof removed from said internal shoulder;

(g) a brush block mounted on said shaft and rotatable therewith;

(h) wiper means carried by said brush block, said wiper means adapted to wipe said resistive track and said conductive track, respectively; and (i) takeoff means to connect said wiper means to an external circuit.

18. A device as in claim 17 wherein said casing is formed of high temperature-resistant stainless steel, said ceramic element formed of high temperature-resistant steatite, said resistance track being formed of high temperature-resistant cermet resistive material, and said conductive track formed of high temperature-resistant cermet conductive material.

19. A device as in claim 17, wherein said fingers are each formed with a transverse undercut in a portion thereof, to thereby increase the resiliency of said fingers.

References Cited in the file of this patent

UNITED STATES PATENTS

| 2,437,166 | Lodge | Mar. 2, 1948 |
| 2,773,966 | Mastropole | Dec. 11, 1956 |

FOREIGN PATENTS

| 847,919 | Great Britain | Sept. 14, 1960 |